United States Patent [19]

Moroe

[11] Patent Number: 4,840,344
[45] Date of Patent: Jun. 20, 1989

[54] TERMINAL PROVIDED WITH A PRINTER

[75] Inventor: Tomomi Moroe, Ohtsu, Japan

[73] Assignee: Omron Tateisi Electronics Co., Kyoto, Japan

[21] Appl. No.: 59,783

[22] Filed: Jun. 8, 1987

[30] Foreign Application Priority Data

Jun. 9, 1986 [JP] Japan .............................. 61-87741[U]

[51] Int. Cl.⁴ .............................................. F16M 1/00
[52] U.S. Cl. .................................... 248/676; 364/708; 312/208; 400/691
[58] Field of Search ... 364/200 MS File, 900 MS File, 364/519, 710, 708; 340/700; 312/208, 196; 400/691, 693; 248/676, 1 B, 1 A; 361/388, 389, 390, 391

[56] References Cited

U.S. PATENT DOCUMENTS

| | | | |
|---|---|---|---|
| 4,038,535 | 7/1977 | Aldridge et al. | 235/152 |
| 4,343,968 | 8/1982 | Toyomura | 178/23 R |
| 4,372,694 | 2/1983 | Bovio et al. | 400/88 |
| 4,455,618 | 6/1984 | Walden et al. | 364/900 |
| 4,498,144 | 2/1985 | Haneda | 364/900 |
| 4,635,219 | 1/1987 | Howard | 364/710 |
| 4,707,156 | 11/1987 | Clark | 400/613.2 |
| 4,725,157 | 2/1988 | Nakai et al. | 400/680 |

*Primary Examiner*—Gary V. Harkcom
*Assistant Examiner*—Randy W. Lacasse
*Attorney, Agent, or Firm*—Stevens, Davis, Miller & Mosher

[57] ABSTRACT

A terminal is mounted on a base member of a printer support. The base member has a supporting member extending upwardly therefrom. A printer unit is mounted on the supporting member near and above the terminal. The operation portion of the printer unit is close to that of the terminal to achieve a high interactive operability therebetween. A control circuit board for the printer is mounted within the printer support and preferably in the base member which is relatively wide permitting the mounting of all control circuits for the printer unit on a single circuit board. The base member housing the circuit board can be made thin to reduce overall height of the terminal and printer support.

7 Claims, 1 Drawing Sheet

TERMINAL PROVIDED WITH A PRINTER

BACKGROUND OF THE INVENTION

Field of the Invention

This invention relates to a terminal, for example, a user identifier terminal which interrogates a host computer to check the user's identification number or PIN code; an electronic cash register terminal for receiving data concerning sold merchandise; or a card authorization terminal used, for example, in ATM and CD machines, which conducts financial transactions in connection with one or more accounts in a host computer. More particularly, the invention relates to a terminal having a printer, which prints the data entered into the terminal, or the data transmitted for a host computer.

When a printer is connected to a terminal, the printer is typically disposed separately from the terminal or is detachably connected to one side of it. A printer which is combined with the terminal in this way has an undesirably large installation area which decreases the customer service area. In addition, the interactive operability between the printer and the terminal is lowered. Moreover, for terminals having detachable printers, there is a further disadvantage in that a spare area is required for storage of the detached printer.

SUMMARY OF THE INVENTION

It is, therefore, an object of this invention to provide a terminal having a printer mounting arrangement which reduces the installation area.

It is another object to provide a terminal provided with a printer which upgrades the interactive operability between the printer and the terminal.

According to this invention, there is provided a terminal provided with a printer support, the support comprising a base member for receiving a terminal mounted thereon, the base having a supporting member extending upwardly from the base member; a printer unit supported by the supporting member opposing the terminal mounted on the base; and a control circuit board mounted within the printer support for controlling the printer unit.

DETAILED DESCRIPTION OF THE INVENTION

Figure 1:
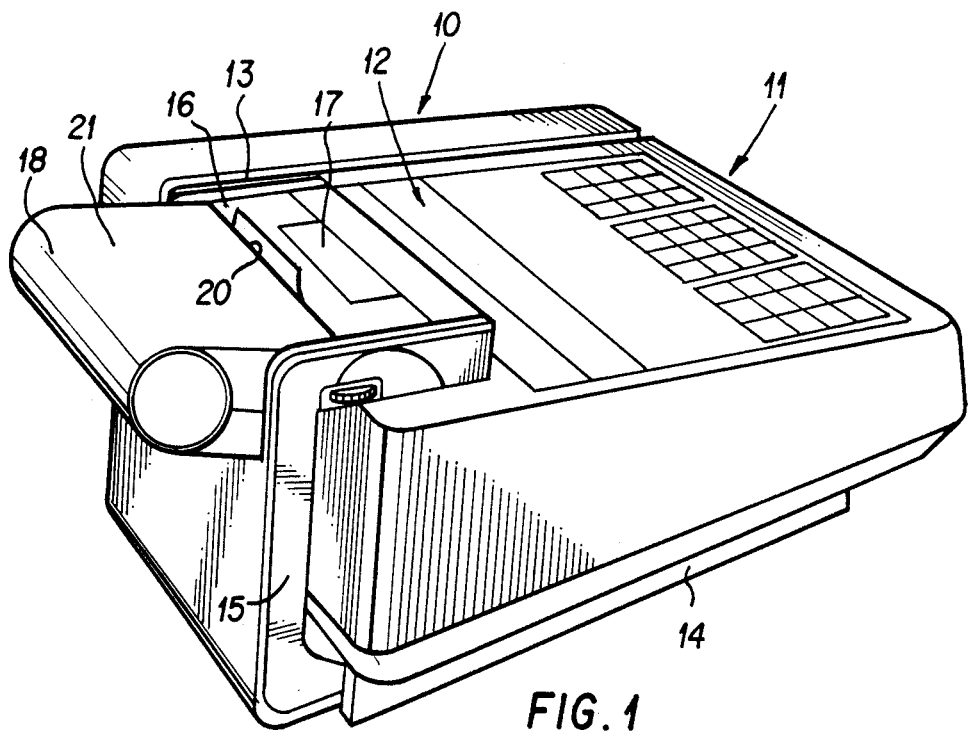
FIG. 1 is a perspective view of a terminal provided with a printer as an embodiment of this invention.
Figure 2:
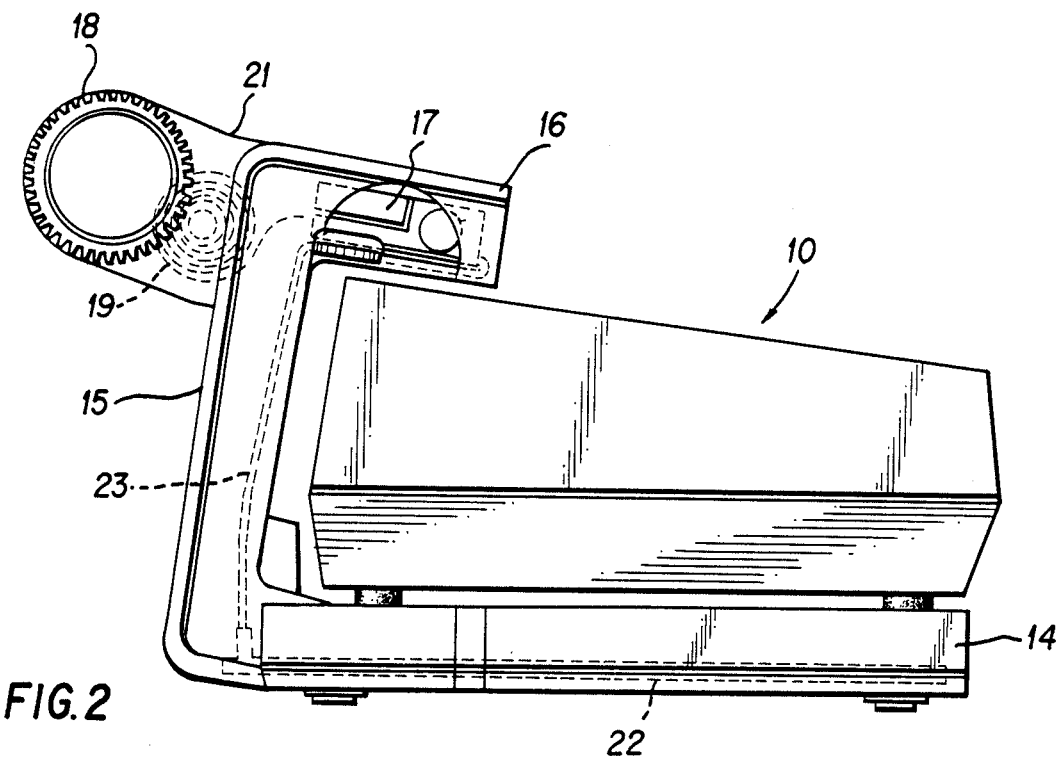
FIG. 2 is a side view of the terminal of FIG. 1.

Referring to FIGS. 1 and 2, there is depicted a terminal as an embodiment of this invention. A terminal 10 is, for example, a desktop electronic cash register for entering data of sold merchandise. Although the invention will be described with reference to an electronic cash register as the terminal, it should be appreciated that the invention can be applied to any type of terminal which requires a printer to deliver a hard copy output. A keyboard 11 is arranged on the front of the terminal 10. The keyboard 11 is used to enter data concerning sold merchandise, such as a merchandise classification, a price, a subtotal, and the sum of the sales. A display screen 12 for displaying the entered data is arranged on the center of the front of the terminal 10. A card reading groove 13 for reading the data on cards used by customers is disposed along the right side of the terminal 10.

The terminal 10 rests on a printer support 8 which has a base member 14 on which the terminal 10 is mounted. The base member 14 is thin and its upper surface area is almost equal to the bottom surface area of the terminal 10. A supporting member 15 is upwardly extended from the left end (as viewed in FIGS. 1 and 2) of the base member 14. A printer mounting portion 16, is extended near and above the left side of the terminal 10, and over a portion of terminal 10 which is not involved in transaction processing, that is, over a portion of terminal 10 which does not include the keyboard 11, display screen 12, or card reading groove 13. A printer unit 17 is mounted on the printer mounting portion 16.

Housed in a paper storing area defined by swollen portion 18 of the mounting portion 16 is a roll of paper 19 which is supplied to the printer unit 17 and discharged from a slit 20 formed on the printer mounting portion 16 after data are printed thereon. The swollen portion 18 has a cover 21 which is opened to load the roll of paper 19 therein. A control circuit board 22 for controlling the printer unit 17 is housed in the printer support 8, preferably in base 14 and electric wiring 23 which connects the printer unit 17 to the circuit board 22 travels through the supporting member 15.

The terminal 10 with the foregoing construction is connected to its host computer and to the cotnrol circuit board 22 (not shown) in a conventional manner. Data concerning sold merchandise entered into the terminal 10 using the keyboard 11, or data transmitted from the host computer to the terminal 10 are printed on the paper 19 by the printer unit 17, with printed paper 19 exiting from the slit 20.

In the preferred embodiment wherein circuit board 22 is mounted in base 14, the circuit board can be widened because the base 14 is wide, and the control circuit can accordingly be mounted on only one circuit board 22. Therefore, the base 14 can be thin, and the overall height of the mechanism, including the terminal 10, is reduced.

In addition, separating the circuit board 22 from the printer unit 17 permits a very compact printer unit 17 which also reduces the overall height of the mechanism, including the printer unit 17, mounted on the printer mounting portion 16.

Moreover, because the printer unit 17 is disposed near and above the terminal 10, the operation portion of the printer unit 17 is close to that of the terminal 10 permitting high interactive operability between the two. Besides this advantage, the small installation area of the terminal 10 and the printer unit 17 increases the service area for customers.

In this embodiment, the printer unit 17 is arranged near and above the left side of the terminal 10 over a portion of terminal 10 not necessary for transaction processing. However, the printer unit 17 may be arranged near and above the display screen 12 if it does not hinder the operation of the terminal 10, particularly viewability of the display screen. Also, the supporting member 15 and base 14 form a generally C-shaped structure in side view, as seen in FIGS. 1 and 2, but other side view profiles are also possible.

It should be understood that the above description is merely illustrative of this invention and that many changes and modifications may be made by those skilled in the art without departing from the scope of the invention. Accordingly, the invention is not limited by the foregoing description, but is only limited by the scope of the claims appended hereto.

I claim:

1. A terminal support including an integral printer unit comprising:
   a printer unit support comprising a base member for receiving a terminal mounted thereon, and a supporting member connected to and extending upwardly from said base member;
   a printer unit supported by said supporting member at a location which overlies at least a portion of a terminal mounted on said base member; and
   a control circuit board mounted within said printer unit support for controlling said printer unit.

2. A terminal support according to claim 1, wherein said control circuit board is mounted in said base member.

3. A terminal support according to claim 2, wherein said control circuit board is connected to said printer unit through electric wiring which passes through said supporting member.

4. A terminal support according to claim 1, wherein said printer unit support includes means for housing paper to be printed on by said printing unit, said paper housing means being supported by said upwardly extending supporting member.

5. A terminal support according to claim 4, wherein said housing means totally encloses paper housed therein and said printer support is openable to permit entry into a paper storing area of said housing means.

6. A terminal support according to claim 1, wherein said base member and supporting member form a generally C-shaped profile in side view.

7. A terminal support according to claim 1 wherein said base member has an upper surface area which is less than a bottom surface area of said terminal mounted thereon.

* * * * *